Jan. 22, 1963 G. A. ULRICH 3,074,735
VEHICLE STEERING MECHANISM HAVING ANTI-LASH DEVICE
Filed June 13, 1960 3 Sheets-Sheet 1

GLENN A. ULRICH
INVENTOR.

BY
ATTORNEYS

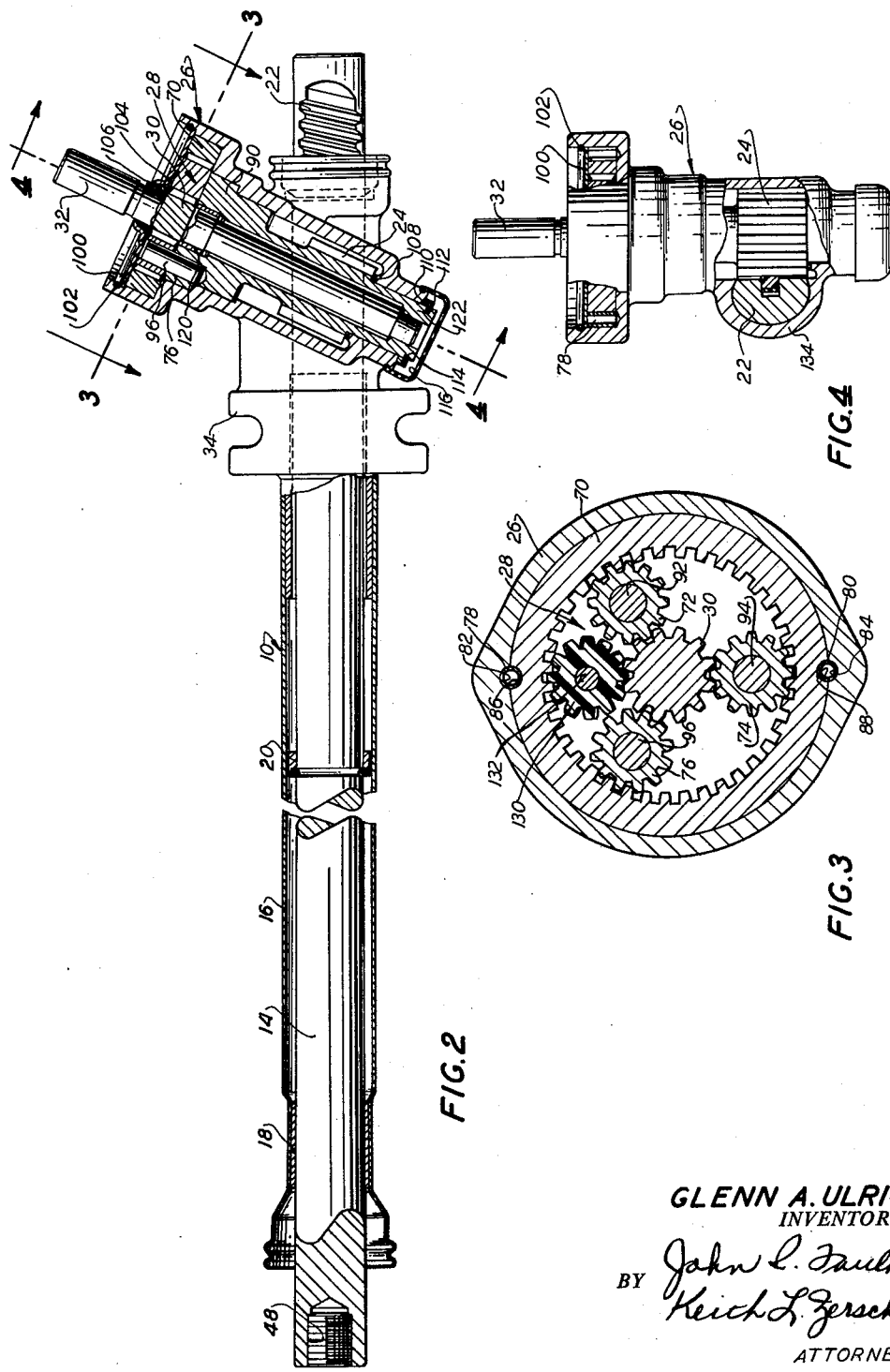

Jan. 22, 1963  G. A. ULRICH  3,074,735
VEHICLE STEERING MECHANISM HAVING ANTI-LASH DEVICE
Filed June 13, 1960  3 Sheets-Sheet 3
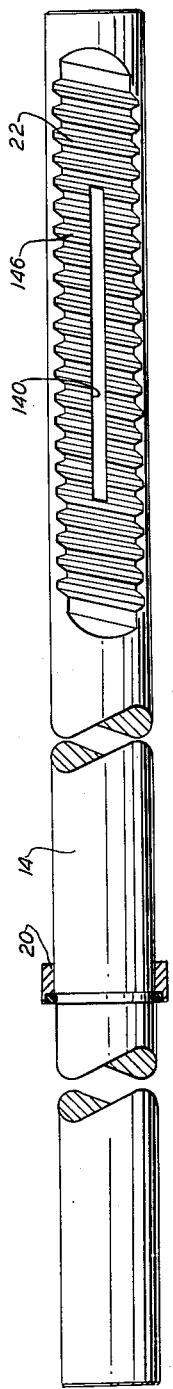
FIG.5
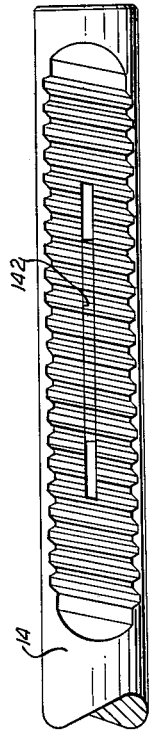
FIG.6
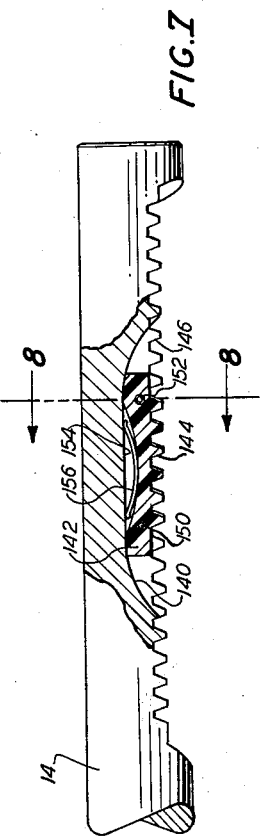
FIG.7
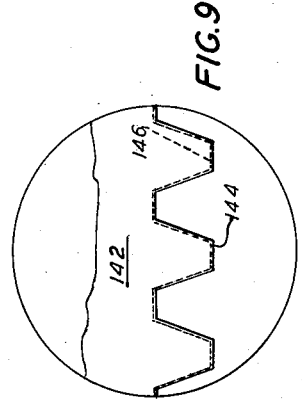
FIG.9
FIG.8
GLENN A. ULRICH
INVENTOR.
BY *John P. Faulkner*
*Keith L. Zerschling*
ATTORNEYS

United States Patent Office 3,074,735
Patented Jan. 22, 1963

3,074,735
VEHICLE STEERING MECHANISM HAVING ANTI-LASH DEVICE
Glenn A. Ulrich, Garden City, Mich., assignor to Ford Motor Company, Dearborn, Mich., a corporation of Delaware
Filed June 13, 1960, Ser. No. 35,806
8 Claims. (Cl. 280—96)

This invention relates to means for eliminating lash in a rack and pinion gear set and to a steering mechanism employing a rack and pinion gear set incorporating this lash eliminating means.

In rack and pinion gear sets, a certain amount of clearance or lash between the teeth of the gears results from tolerances that must be permitted in mass production techniques. This clearance or lash results in a certain amount of lost motion between the rack and the pinion of the gear set thereby producing undesirable characteristics in mechanisms employing rack and pinion gear sets and particularly in steering mechanisms employing rack and pinion gear sets.

In steering mechanisms the lash between the gears employed should be reduced to a minimum if precise steering is desired. A good steering mechanism should produce an output which instantaneously follows the input from the steering wheel. If lash is permitted between the gears of the steering mechanism, the motor vehicle operator may be able to move the steering wheel a certain amount without affecting the position of the steerable wheels of the vehicle. This is commonly called steering wheel play and it results in undesirable and often dangerous steering characteristics particularly when the wheels are in a straight ahead position and the vehicle is moving at high speeds.

Lash in the gears of the steering mechanism also results in road shocks or other vibrations being transmitted more noticeably from the steerable wheels and other steering mechanisms back to the steering wheel of the motor vehicle. These vibrations and shocks cause driver fatigue and may make the vehicle difficult to control.

The present invention eliminates lash in a rack and pinion gear set by providing an insert in the rack that has teeth engaging the teeth of the pinion in an interference fit relationship. This insert is preferably constructed of a material capable of substantial elastic deformation, for example, nylon, and is preferably spring loaded against the pinion.

In the preferred embodiment of the invention, the insert is positioned in a longitudinal slot along the center of the rack and is pinned in the rack at either end. The teeth of the insert may be the same size as the teeth of the rack and a spring may be positioned to urge the center portion of the insert outwardly from the teeth of the rack. This causes the teeth in the center portion of the insert to protrude outwardly from the teeth of the rack and thus engage the teeth of the pinion in an interference fit relationship. The teeth of the insert may also be made larger than the teeth of the rack so that the teeth of the insert engage the teeth of the pinion in an interference fit relationship. These arrangements eliminate lash between the rack and pinion of a rack and pinion gear set when the pinion is in engagement with the insert.

This invention is particularly advantageous in a steering mechanism of an automotive vehicle employing a rack and pinion gear set between the steering wheel and the steerable or dirigible wheels. In this case the insert is positioned within the rack so that an interference fit is provided between the teeth of the insert and the teeth of the pinion when the wheels are in a straight ahead position or a certain amount either side of this straight ahead position. This eliminates lash in the gear set and play in the steering wheel. This is particularly advantageous when the operator of the vehicle is engaged in corrective steering as may occur during high speed driving. Additionally, this insert provides a slight amount of loading between the rack and pinion when the wheels are in the vicinity of the straight ahead position and this loading falls off as the wheels are turned toward either left or the right. Thus, the present invention eliminates steering wheel play in an automotive vehicle and also provides a steering mechanism in which the loading on the gears employed falls off either side of the center position of the vehicle wheels.

An object of the invention is the provision of a means for eliminating lash in a rack and pinion gear set.

Another object of the invention is the provision of a steering mechanism for an automotive vehicle in which lash is eliminated from the gear train employed.

A further object of the invention is the provision of a steering mechanism for an automotive vehicle in which steering wheel play is eliminated.

Still another object of the invention is the provision of a steering mechanism for an automotive vehicle in which a loading of the gear train employed is accomplished when the wheels of the vehicle are in the center position or slightly to the left or right thereof and in which the loading falls off as the vehicle wheels are turned toward either the left or the right.

Other objects and attendant advantages of the present invention will become more readily apparent as the specification is considered in connection with the accompanying drawings in which:

FIG. 2 is a longitudinal sectional view of a portion of the steering mechanism of the present invention;

FIG. 3 is a cross-sectional view taken along the lines 3—3 of FIG. 2;

FIG. 4 is a sectional view partially in elevation taken along the lines 4—4 of FIG. 2;

FIG. 5 is an elevational view of a steering rod and the rack of the present invention without the insert;

FIG. 6 is an elevational view of the rack of the present invention with the insert in place;

FIG. 7 is a sectional view partially in elevation of the rack of the present invention showing the insert and the spring for loading the insert;

FIG. 8 is a sectional view taken along the lines 8—8 of FIG. 7, and

FIG. 9 is an enlarged elevational view showing the relationship of the teeth of the insert to the teeth of the rack when the insert is not engaged with the pinion of the present invention.

Figure 1:
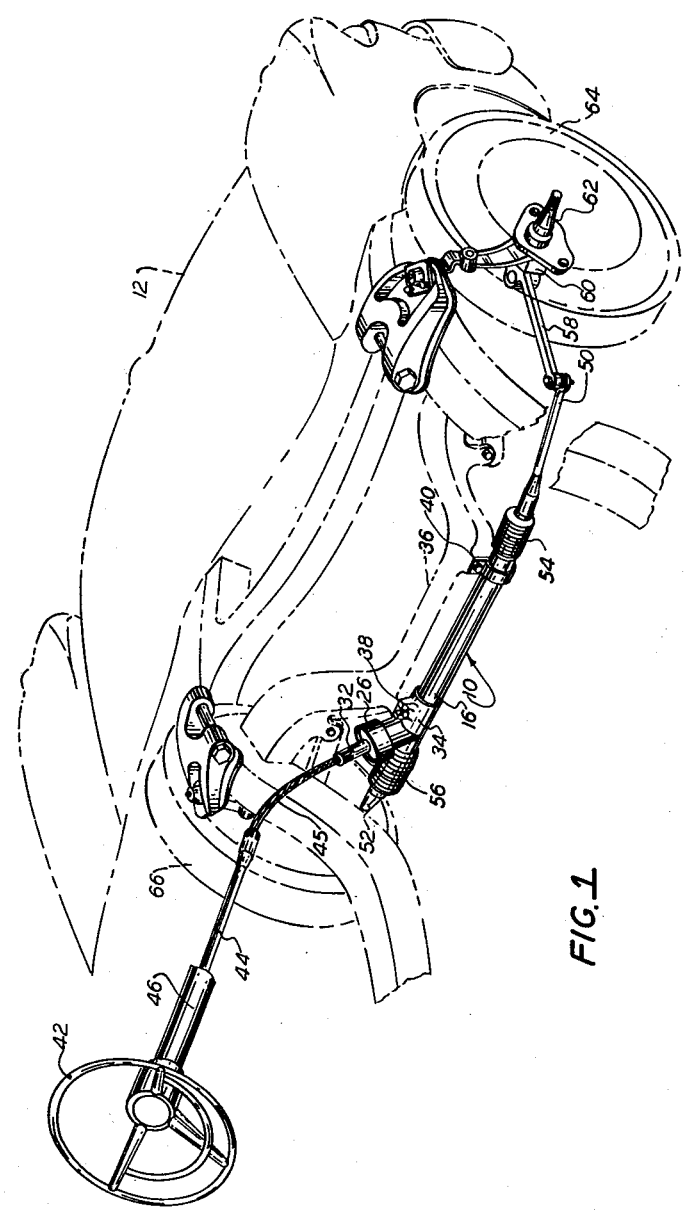
FIG. 1 is a view showing the steering mechanism of the present invention mounted in a motor vehicle.

Referring now to the drawings in which like reference numerals designate like parts throughout the several views thereof, there is shown in FIG. 1 a steering mechanism of the present invention, generally designated by the numeral 10, positioned in a motor vehicle shown in phantom form and generally designated by the numeral 12. As can best be seen by reference to FIG. 2, the steering mechanism 10 includes a steering rod 14 slidably positioned within a housing 16 by means of bearing 18 located adjacent one end of the rod and by means of a similar bearing (not shown) positioned adjacent the other end of the rod. The steering rod 14 includes a rack portion 22 at one end thereof for engagement with a pinion gear 24 which is positioned within a reduction gear housing 26. The rod also has a stop member 20 affixed thereto by means of a snap ring.

The reduction gear housing 26 carries a planetary reduction gear train, generally designated by the numeral 28, and this gear train includes a sun gear 30 affixed or formed integrally with an input shaft 32.

The reduction gear housing 26 includes a portion 34 which receives the steering rod housing 16, and this portion of the housing is affixed to a frame crossmember 36 of automotive vehicle 12 by means of bolts, one of which is shown at 38. The steering rod housing 16 is also affixed to this crossmember by means of bracket 40.

The input shaft 32 to the planetary gear train 28 is connected to a steering wheel 42 through any suitable means, preferably a steering wheel shaft 44 and a flexible cable 45. The flexible cable may be connected to the steering wheel shaft and to the input shaft 32 by means of swaging. The steering wheel shaft 44 may be suitably mounted in a steering column tube 46 which in turn may be suitably affixed to the vehicle by any conventional means (not shown). The steering rod 14 includes a threaded bore at each end thereof, one of which is shown at 48. One end of a ball joint assembly, preferably the housing, is threaded into each of the threaded bores. A pair of steering links 50 and 52 are connected to the other end of the ball joint assemblies, the ball parts. These ball joint assemblies have not been shown in the drawings, but it is understood that any conventional ball joint assemblies will suffice. Thus, the ball joint assemblies connect the steering rod 14 with a pair of steering links 50 and 52, and these ball joint assemblies are covered by a pair of suitable flexible boots 54 and 56. The steering link 50 is connected to a knuckle arm 58 which in turn is connected to a steering knuckle 60. The steering knuckle 60 includes a spindle 62 which rotatably supports a dirigible or steerable wheel 64 of the motor vehicle. The motor vehicle also includes a second dirigible or steerable wheel 66 which is connected to steering link 52 through another knuckle arm, steering knuckle and spindle (not shown).

The planetary reduction gear set 28 includes the sun gear 30 affixed to the input shaft 32, a ring gear 70 positioned within the reduction gear housing 26 and a plurality of planet gears, designated by the numerals 72, 74 and 76. The ring gear is restrained from rotation by a pair of pins 78 and 80 which are received within grooves 82 and 84 in the housing 26 and grooves 86 and 88 in the ring gear. The planet gears 72, 74 and 76, are rotatably positioned upon a planet carrier 90 by means of pins 92, 94 and 96. The planet carrier 90 may be integrally formed with the pinion 24.

The sun gear 30 of the planetary gear set is held within housing 26 by means of a cover 100 that in turn is held in place by a snap spring 102. The cover positions a thrust washer 104 against the sun gear 30 and also positions a sealer material 106 against the input shaft 32. The planet carrier 90, including the pinion 24, is rotatably mounted within the housing 26 and any thrust loads are taken by a thrust washer 108 and by a thrust washer 110. Thrust washer 110 is positioned against the outer end of the housing by a snap ring 112 positioned in an annular channel 114 in the planet carrier. A cap 116 of any suitable material may be positioned over the end of the housing 26. The input shaft 32, including sun gear 30, is rotatably supported within the planet carrier by means of a sleeve bearing 120 positioned adjacent the sun gear and by being received within a portion 122 of the planet carrier positioned adjacent the cap 116.

The planetary gear train 28 may include means for eliminating the lash therefrom for example, a planet gear, designated by the numeral 130 in FIG. 3. This planet gear may be rotatably mounted upon a pin 132 that is carried by planet carrier 90. The planet gear 130 is arranged and constructed to produce an interference fit with the ring gear 70 and the sun gear 30. It is preferably constructed of a material which is capable of substantial elastic deformation and which has a substantially smaller modulus of elasticity and rigidity than the material of the other gears in the gear train. This means for eliminating lash from the planetary gear train is more fully described and is claimed in copending application Serial No. 35,805, filed June 13, 1960 in the name of John R. Elwell, entitled Anti-Lash Device and assigned to the assignee of the present invention.

The present invention provides a means for eliminating lash between the rack 22 and the pinion 24. As can best be seen by reference to FIG. 4, the rack 22 is slidably positioned within a protuberance 134 in housing 26 so that it is maintained in engagement with the pinion 24.

Referring now to FIG. 5, there is shown an elevational view of the steering rod 14 including the rack 22. The rack 22 has a longitudinal slot 140 disposed in the central portion thereof. An insert 142, preferably constructed of a material capable of substantial elastic deformation compared to the material of the rack and pinion, is positioned within slot 140 as can be seen by reference to FIGS. 6 and 7. This insert may be constructed of a nonmetallic material, such as, nylon or other similar material, while the rack and pinion may be constructed of steel. This insert is thus constructed of a material having a substantially smaller modulus of elasticity and modulus of rigidity than the material of the rack and pinion. The insert includes teeth 144 of the same size as the teeth 146 of the rack 22. The central portion of the insert has a smaller cross sectional area than the ends thereof as can be seen by reference to FIG. 7. The ends of the insert are pinned to the rack by means of cross pins 150 and 152 which may be driven through the material of the insert. Driving the pins 150 and 152 through the material of the insert affixes the ends of the insert to the pins and to the rack so that no clearance or play exists.

Means for urging the central portion of the insert 142 toward the pinion 24 are positioned within a space 154 between the rack and the central portion of the insert. This means preferably takes the form of a leaf spring 156. It can thus be seen that the insert 142 takes the form of a beam having a central portion which is spring loaded outwardly from the teeth of the rack and toward the pinion 24. This spring means may position the teeth of the insert several thousandths of an inch beyond the teeth of the rack when the insert is not engaged with the pinion 24. The position of the teeth of the insert in relation to the teeth of the rack is shown in exaggerated form in FIG. 9. This provides an interference fit between the teeth of the insert and the teeth of the pinion thereby eliminating lash between the rack 22 and the pinion 24. The teeth of the insert 142 may also be made larger than the teeth of the rack to provide the desired interference fit relationship. In addition, the spring loaded insert provides a slight loading between the rack and the pinion when the teeth of the pinion are in engagement with the teeth of the insert.

In the operation of the track and pinion gear set of this invention, the spring 156 urges the teeth of the central portion of the insert above the teeth of the rack, and hence when the pinion comes into engagement with the central portion of the rack it engages the teeth of the insert in an interference fit relationship. This eliminates lash between the rack and the pinion when the pinion is positioned along the length of the rack such that the teeth of the pinion engage the teeth of the insert.

The rack and pinion gear set described may be conveniently employed with a steering mechanism of a motor vehicle, and in this instance the lash eliminating means for the rack and pinion provides the advantage of eliminating play in the steering wheel, particularly when the operator is engaged in "corrective steering" at high vehicle speeds, and it also assists in preventing road shocks and other vibrations from being transmitted from the steerable or dirigible wheels back to the steering wheel of the vehicle.

When the steering wheel 42 is turned, the input shaft 32 and sun gear 30 are rotated by means of the steering wheel shaft 44 and the flexible cable 45. This rotational motion is reduced by the planetary gear train 28 previously described and is transmitted to the rack 22 by the pinion 24. The rack and pinion converts the rotary motion to linear motion and this linear motion is transmitted to the steerable wheels 64 and 66 of the motor vehicle through the steering rod 14, links 50 and 52, and the knuckle arms, steering knuckles and spindles, one set of which have been designated by the numerals 58, 60 and 62.

When the wheels 64 and 66 of the motor vehicle are in the center position or slightly to the left or to the right thereof, the pinion 24 is in engagement with the insert 142 and that portion of the rack that carries the insert. In this position then, lash is eliminated between the rack and the pinion and play is eliminated from the steering wheel 42. This is particularly important during high speed driving conditions when a small amount of corrective steering is needed. The invention also provides a precise feel to the vehicle operator and provides a small amount of loading between the rack and the pinion when the wheels are in the straight ahead position of slightly to the left or right thereof. As the steering wheel is turned to the right or left, this loading falls off as he pinion comes out of engagement with the insert and that portion of the rack that carries the insert.

Excessive movement of the rod 14 in one direction, during steering operations, is prevented by engagement of the stop 20 with the sleeve-like projection of the portion 34 of housing 26. Excessive movement in the other direction is prevented by engagement of the housing of the ball joint assembly affixed to the end of the rod adjacent the rack 22 with housing 26.

Although the lash eliminating means of this invention is shown and described in relation to a manual steering mechanism employing a rack and pinion gear set, it may be employed equally well with a power steering mechanism incorporating a rack and pinion gear set. Also, the planetary reduction gear train may be eliminated in certain automotive steering mechanisms so that the pinion gear of the rack and pinion gear set is connected directly to the steering wheel of the vehicle.

The present invention thus provides a means for eliminating lash in a rack and pinion gear set, and further provides a steering mechanism for an automotive vehicle in which lash is eliminated from the gear train employed.

It will be understood that the invention is not to be limited to the exact construction shown and described and that various changes and modifications may be made without departing from the spirit and scope of the invention as defined in the appended claims.

I claim:

1. In a gear set including a pinion and a rack with a central longitudinal groove positioned therein, an insert positioned within said groove and being affixed to the rack at either end, said insert being constructed of a material having a substantially smaller modulus of elasticity than the material of the rack and pinion and being capable of substantial elastic deformation, the central portion of said insert having a plurality of teeth for engagement with said pinion, the side of said central portion opposite said teeth being spaced from said rack whereby said insert may deflect toward and away from from said pinion.

2. In a gear set including a pinion and a rack with a central longitudinal groove positioned therein, a plastic insert positioned within said groove and being affixed to the rack at either end thereof, the central portion of said insert having a plurality of teeth for engagement with said pinion, the side of said central portion of said insert opposite said teeth being spaced from said rack to permit said insert to deflect within said rack, and spring means engaging the central portion of said insert and said rack for biasing the teeth of said central portion of said insert toward said pinion.

3. A rack and pinion gear set comprising, a pinion, a rack positioned in engagement with said pinion and having a portion with a plurality of teeth positioned therein, said portion having a centrally disposed longitudinal slot positioned therein, an insert having a central toothed portion positioned within said rack, and means engaging the insert and the rack for biasing said central toothed portion into engagement with said pinion.

4. A rack and pinion gear set comprising, a pinion, a rack positioned in engagement with said pinion and having a portion with a plurality of teeth positioned therein, said portion having a centrally disposed longitudinal slot positioned therein, an insert having a central portion with a plurality of teeth, the teeth of said insert being substantially the same size and configuration as the teeth on said rack, and means engaging said insert and said rack for biasing the teeth of said insert toward said pinion so that when the teeth of said insert are not in engagement with the pinion the teeth of the insert project beyond the teeth of said rack.

5. A steering mechanism for an automotive vehicle comprising an input shaft, a pinion, said input shaft and said pinion being mechanically coupled, said input shaft also being adapted to be connected to a steering wheel of said vehicle, a rack positioned in engagement with said pinion and adapted to be connected to steerable wheels of said vehicle, said rack having a longitudinally disposed slot positioned therein, an insert positioned within said slot, and spring means engaging said rack and said insert for urging said insert into an interference fit relationship with said pinion.

6. A steering mechanism for an automotive vehicle comprising an input shaft, a pinion, said input shaft and said pinion being mechanically coupled, said input shaft also being adapted to be connected to a steering wheel of said vehicle, a rack positioned in engagement with said pinion and adapted to be connected to steerable wheels of said vehicle, said rack including an insert having a plurality of teeth engaging said pinion in an interference fit, and means engaging said rack and said insert for urging said insert into engagement with said pinion, said means acting in a direction substantially perpendicular to the longitudinal axis of said rack.

7. A steering mechanism for an automotive vehicle comprising an input shaft, a pinion, said input shaft and said pinion being mechanically coupled, a steering wheel, said steering wheel being connected to said input shaft, a rack positioned in engagement with said pinion, a steerable wheel, means coupling said steerable wheel to said rack, said rack having a centrally located longitudinal slot positioned therein, a nonmetallic insert positioned in said slot, and means positioned in said slot and engaging said rack and said insert for urging said insert toward said pinion, whereby said pinion engages said insert in an interference fit relationship when the wheels of said vehicle are postioned in a substantially straight ahead position.

8. In a gear set including a rack and pinion, a member supported by said rack and having a plurality of teeth, said teeth protruding beyond the teeth of said rack in a direction toward said pinion and substantially perpendicular to the axis of said rack when the teeth of the member are not in engagement with said pinion, said member being capable of deflection with respect to said rack away from said pinion whereby the teeth of said member that come into engagement with said pinion move into substantial alignment with the teeth of the rack.

References Cited in the file of this patent

UNITED STATES PATENTS

| 719,562 | Brush | Feb. 3, 1903 |
| 1,317,232 | Spillman | Sept. 30, 1919 |
| 1,564,160 | Wegert | Dec. 1, 1925 |
| 2,060,565 | Geyer | Nov. 10, 1936 |
| 2,466,218 | Farrell et al. | Apr. 5, 1949 |
| 2,548,603 | Hallstrand | Apr. 10, 1951 |
| 2,959,064 | Geyer | Nov. 8, 1960 |